(12) United States Patent
Nguyen et al.

(10) Patent No.: US 6,212,309 B1
(45) Date of Patent: Apr. 3, 2001

(54) OPTICAL CROSS POINT SWITCH USING DEFORMABLE MICROMIRROR

(75) Inventors: Tam Nguyen; John Miller; Milan Skubnic, all of Ottawa (CA)

(73) Assignee: Mitel Corporation, Kanata (CA)

( * ) Notice: Subject to any disclaimer, the term of this patent is extended or adjusted under 35 U.S.C. 154(b) by 0 days.

(21) Appl. No.: 09/234,306

(22) Filed: Jan. 21, 1999

Related U.S. Application Data

(60) Provisional application No. 60/073,928, filed on Feb. 6, 1998.

(30) Foreign Application Priority Data

| Jan. 24, 1998 | (GB) | ................................................. 9801443 |
| Sep. 4, 1998 | (CA) | ................................................. 2246559 |

(51) Int. Cl.$^7$ ................................................. G02B 6/36
(52) U.S. Cl. ................................. 385/17; 385/18; 385/20
(58) Field of Search ........................................ 385/16–21

(56) References Cited

U.S. PATENT DOCUMENTS

| 4,698,602 | 10/1987 | Armitage . |
| 5,345,521 | 9/1994 | McDonald et al. . |
| 5,960,132 | * 9/1999 | Lin ........................................... 385/18 |

FOREIGN PATENT DOCUMENTS 296-18-818   12/1996  (DE) .

OTHER PUBLICATIONS

Toshiyoshi et al, "Electrostatic Micro Torsion Mirrors for an Optical Switch Matrix", Journal of Microelectromechanical Systems, vol. 5, No. 4, pp. 231–237, Dec. 1996.*

* cited by examiner

*Primary Examiner*—Hung N. Ngo
(74) *Attorney, Agent, or Firm*—Marks & Clerk

(57) ABSTRACT

A photonic switching device has a first set of optical waveguides, a second set of optical waveguides, and an arrangement of controllable deformable micromirrors for selectively completing an optical path between any one of the first set of waveguides and any one of the second set of waveguides. Typically, the deformable mirrors are arranged in a pair of opposed grid arrays with the input and output waveguides extending along respective rows and columns in the manner of a crosspoint switch, but with the rows and columns intersecting at an oblique angle.

23 Claims, 5 Drawing Sheets

OPTICAL CROSS POINT SWITCH USING DEFORMABLE MICROMIRROR

CROSS REFERENCE TO RELATED APPLICATION

This application claims priority under 35 U.S.C. § 119(e) from U.S. Provisional Application No. 60/073,928, filed Feb. 6, 1998.

FIELD OF THE INVENTION

The invention relates to semiconductor devices, and in particular to a device for switching photonic signals in optical networking applications.

BACKGROUND OF THE INVENTION

Optical fibers are used to carry high speed data as optical signals. These optical signals must be switched between fibers to allow a signal routing function. There are a currently number of methods for achieving switching.

FIG. 1 shows an electromechanical arrangement, where a signal in an optical fiber A is routed to fiber B by mechanically aligning fiber A with fiber B. This arrangement is bulky and mostly suited only 1×N configurations.

An alternative solution is to use a hybrid optical switch. This arrangement is shown in FIG. 2. Firstly, the optical signals are converted to electrical signals, which are switched in a conventional manner, and the resulting outputs of the switch matrix are converted back to optical signals. The conversion process inherently makes this type of switching unidirectional.

Semiconductor optical switches are known. Presently, these are wave guide based and rely on the change of refractive indices in the waveguides under the influence of an external electric field, current or other perturbations. The most common types are: directional coupler switches, mach-zehnder interferometers, and digital optical switches.

A directional coupler switch, as shown in FIG. 3, consists of two coupled semiconductor wave guides. Light is injected into one of two input waveguides. When the signal reaches a region where two waveguides are weakly coupled to one another, light can be transferred from one guide to the other by altering the index of refraction of one of the guide with respect to the other. To construct a 4×4 crosspoint switch, four of these couplers are required as shown in FIG. 4.

A Mach-Zehnder interferometer is shown in FIG. 5. This consists of an input waveguide and an output waveguide. Light in the input waveguide is split into two paths associated with respective electrodes. The two paths recombine at the output. Depending on the optical path difference that can be electronically controlled by impressing an electrical signal on one of the electrodes, the interference at the output Y-junction can be destructive or constructive depending on the relative phase of the two paths.

As is the case with directional couplers several of these switches must be cascaded to perform the NXN switching function.

A digital optical switch is shown in FIG. 6. Such switches operate on the "adiabatic change" principle. A beam is split into two optically identical arms with equal intensity in each arm. By influencing electrodes associated with each arm, the effective index in one arm can be reduced sufficiently to transfer all the light in this arm to the other. These switches must also be cascaded to achieve N×N switching.

An object of the invention is to alleviate this problem.

SUMMARY OF THE INVENTION

According to the present invention there is provided a photonic switching device comprising a first set of optical waveguides, a second set of optical waveguides, first and second opposed arrays of controllable deformable micromirrors associated respectively with said first and second sets of optical waveguides, at least one of said arrays being arranged in rows and columns, and means for selectively tilting pairs of said micromirrors, one from each array, to complete an optical path from any one of said first set of optical waveguides to any selected one of said second set of optical waveguides.

Micromirrors are known per se, and are described, for example, in U.S. Pat. No. 4,698,602. They consist of numerous mirror elements suspended on a substrate by mechanically compliant torsion hinges that allow individual mirrors to be tilted under the application of a voltage to a control electrode associated with each mirror element. They are typically used in imaging applications.

In the preferred embodiment, the arrangement of deformable micromirrors comprises first and second opposed arrays of controllable deformable micromirrors arranged in rows and columns, a first set of optical waveguides associated with the rows of one of said arrays, and a second set of optical waveguides associated with the columns of the other of said arrays, whereby selected micromirrors from each of said arrays can be tilted to complete an optical path from any one of said first set of optical waveguides to a selected one of said second set of optical waveguides.

For reasons to be explained in more detail, the arrays are arranged in a non-rectangular grid, i.e. with the rows intersecting the columns at an oblique angle in a rhombic arrangement. The columns are skewed by an amount such that they are aligned with the reflected light beams. The mirrors are rotationally offset with respect to the path of the light beams by an amount which ensures that an input beam is reflected off an input mirror to an output mirror, where it is reflected in the plane of the output mirrors.

The optical waveguides are preferably coupled to fibers set in micromachined grooves on the substrate supporting the micromirrors.

The invention also provides a method of switching optical signals between a first set of optical waveguides and a second set of optical waveguides, comprising the steps of a) deploying first and second opposed arrays of controllable deformable micromirrors between said first and second set of waveguides, at least one of the arrays being arranged in rows and columns, and b) controlling pairs of said micromirrors, one from each array, to selectively complete an optical path between any one of said first set of waveguides and any selected one of said second set of waveguides.

BRIEF DESCRIPTION OF THE DRAWINGS

The invention will now be described in more detail, by way of example only, with reference to the accompanying drawings, in which.

DETAILED DESCRIPTION OF PREFERRED EMBODIMENTS

Figure 7:
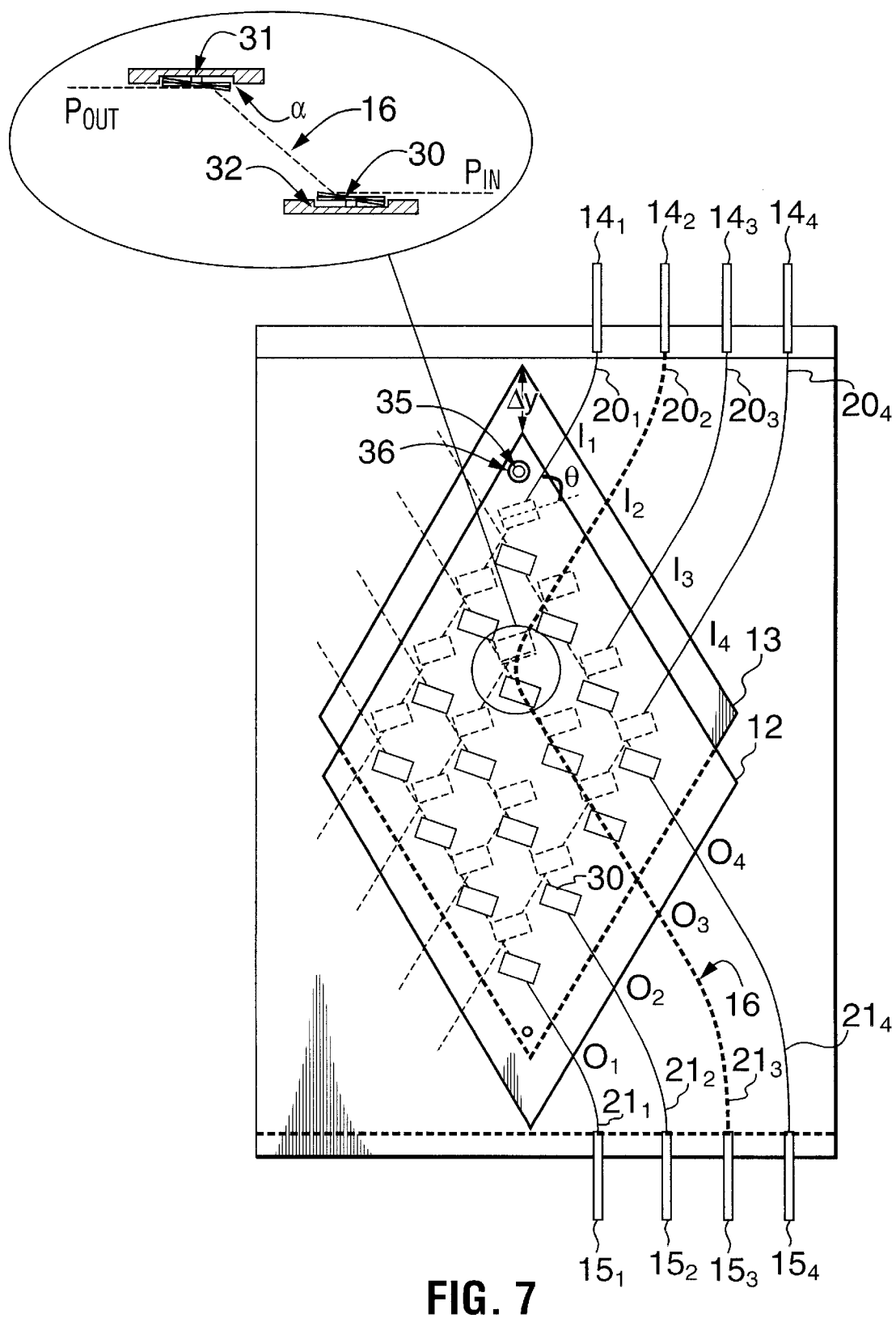
FIG. 7 is a plan view of a photonic crosspoint switch in accordance with one embodiment of the invention.

FIG. 7 shows two superimposed, parallel rectangular substrates that are laterally offset along the y axis as viewed on the page and spaced vertically apart by a distance h (not shown in FIG. 7). The two silicon substrates support rhombic grid arrays 12, 13 of deformable micromirrors. The arrays 12, 13 of micromirrors can be each micromachined onto a silicon substrate, for example, in the manner described in the above-referenced U.S. patent. The mirrors of the upper array 12 are shown in solid lines and the mirrors of the lower array 13 are shown in dotted lines.

The two grid arrays 12, 13 of deformable micromirrors are arranged on substrates 10, 11 (FIG. 8) in two parallel planes $P_{IN}$=input plane, and $P_{OUT}$=output plane. The deformable micromirrors are micromachined structures, which are suspended by mechanically compliant torsion hinges that allow a mirror to be tilted about a torsion axis by applying a voltage to the control electrode of that mirror. As shown in the inset (FIG. 7), the mirrors 30 are mounted on pliant supports 31 in wells 32 and can be tilted by an angle α, which is typically about 10–15°. For the purposes of the invention, the amount of tilt needs to be accurately determined, and to achieve this the mirrors are micromachined so that when fully deflected they come to rest at a known angle. The tilting is achieved by applying a control voltage so that electrostatic forces act on the mirrors.

It is important to have a known and constant angle, but this can be achieved by electrical or mechanical positioning.

The two substrates are stacked one over the other such that the grid arrays 12, 13 are arranged in a generally mutually opposed relationship, although they are offset by a distance δy that depends on the separation of the arrays and the tilt angle. Input optical fibers $14_{1...4}$ are optically aligned with waveguides $20_{1...4}$ which in turn are aligned with corresponding input rows $I_{1...4}$ of the first grid array 13 on the lower substrate, and output fibers $15_{1...4}$ are aligned with waveguides $21_{1...4}$ corresponding columns $O_{1...4}$ of the grid array 12 on the upper substrate.

It will be understood that the designation of the rows and columns is arbitrary. For illustration purposes, the line of micromirrors lying in the beam direction beam will be considered a row. Thus, the input beam travels along the input row of input micromirrors and is reflected out along the output row of output micromirrors, which generally lies at an angle to the input row. The layout is similar to a conventional electrical crosspoint switch except that the input and output lines lie in different planes and are associated with different grid arrays and the rows and columns of at least one array are not generally orthogonal for reasons to be explained in more detail. A particular mirror element is designated by its Cartesian co-ordinates in each grid array ($I_{x,y}$ or $O_{x,y}$). In a conventional electrical switch the output lines would be associated with the same grid array as the input lines. It will also be appreciated that the input and output lines are designated such for the purposes of explanation. The device described is fully bi-directional.

The input and output waveguides $20_{1...4}$, $21_{1...4}$ provide the optical coupling between the input and output fibers and the corresponding line of mirrors.

Optical switching is performed by tilting a mirror 30 in the input row about its torsion hinge and a corresponding mirror in the output row to complete an optical path from the input waveguide to the output waveguide via the two selected mirrors off which the light is reflected. To illustrate the functionality of this structure it is assumed that an input beam on input fiber $14_2$ is to be switched to output fiber $15_3$. To achieve this, the mirrors $I_{23}$ and $O_{32}$ are selected and tilted by applying control voltages to the corresponding control electrodes (not shown). The control voltages drive the mirrors to full deflection so that the angle of tilt is known and constant. The input beam passes over mirror $I_{21}$, and $I_{22}$, which remain parallel to the input plane, $P_{IN}$, and is reflected by mirror $I_{23}$ laterally at an angle toward mirror $O_{32}$, which is located, due to the lateral offset in the path of the reflected beam. Mirror $O_{32}$, in turn reflects the beam toward the output wave guide $21_3$ and thence to the output optical fiber $15_3$, passing over output mirrors $O_{33}$, and $O_{33}$. It will be seen that the mirror elements $I_{23}$ and $O_{32}$ thus complete an optical path 16 (shown in dot-dash lines) from the input optical fiber $14_2$ to the output fiber $15_3$. By an appropriate choice of pairs of mirrors, any input fiber can be switched to any output fiber in the manner similar to a conventional crosspoint switch such that any input of the crosspoints can be connected to any output. The optical crosspoint is non-blocking in that any free input can be connected to any free output.

Figure 9:
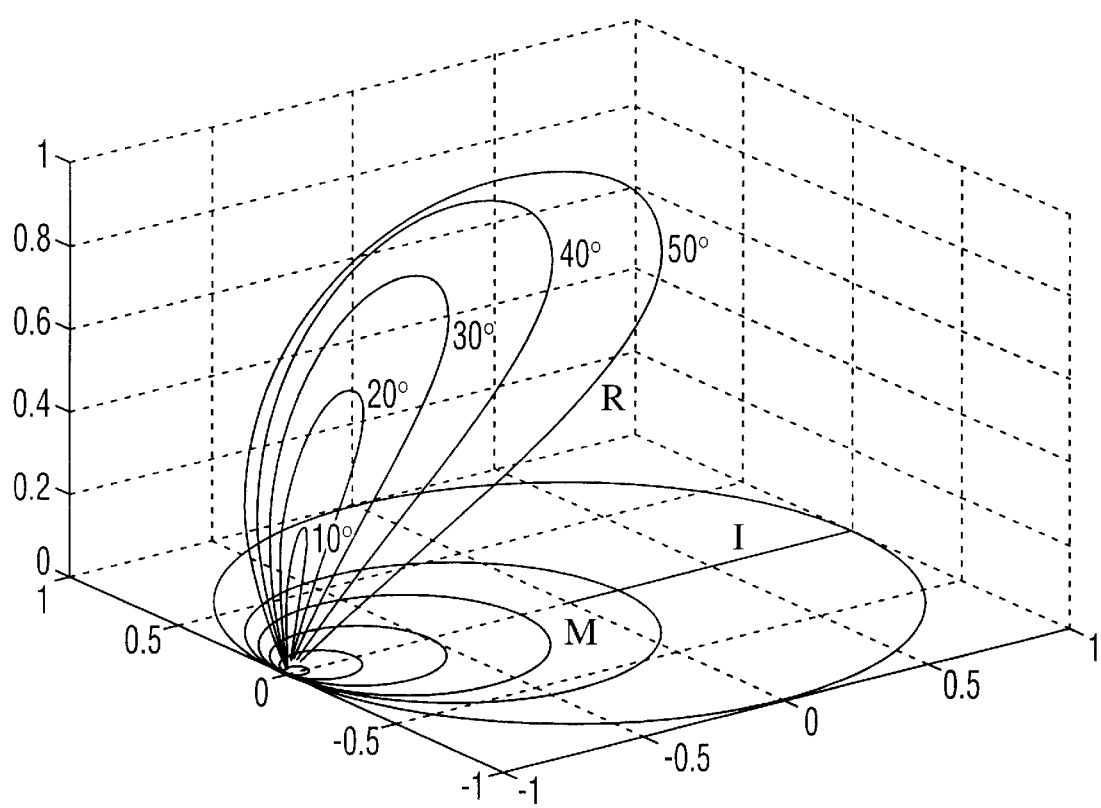
FIG. 9 is a diagram showing the path of a reflected ray as a mirror is rotated for different angles of tilt.

For purposes of explanation, the hypothetical case of two aligned square grids will first be considered. In order for the input beam to be reflected up from mirror directly $O_{32}$ above it, mirror $I_{23}$ would have to be tilted at 45° relative to the plane of the lower chip 11 about an axis perpendicular to the input row $I_2$ and lying in the plane of the chip 11 (the X-Y plane). The output mirror $O_{12}$ would have to be tilted at an angle of 45° out of the plane of the upper chip 10, but in addition, in order to reflect the light along the axis of the column $O_3$, the axis of the mirror would have to be rotated by 90° in the plane of the chip. This can be achieved by setting the hinge axis of the mirror at 90° to the axis of the column. In practice, it is presently not possible to tilt the mirrors more than about 10–15°. There is a mathematical relationship between the tilt angle and rotational offset. For a 10° tilt, the offset angle is about 44°. FIG. 9 shows the locus of an incident ray of light that is reflected by a mirror M for different angles of tilt as the mirror M is rotated through 360° and the projection of the loci on the x-y plane. It will be seen that the reflected ray R crosses a given plane, for example 0.4, at two points. The output mirror has to be located at one of these points.

In order to accommodate tilt angles in the order of 10–15°, the mirrors 30 must be arranged in the diamond shape shown in FIG. 7. The mirrors are aligned along an axis representing the path of a beam over the mirrors. For example, in FIG. 7 the input mirrors are aligned along axes $I_{1...4}$, which represent the paths of the input beams. Each mirror 30 is rotationally offset to this axis by an angle θ, which depends on the tilt angle α of the mirrors. In the case of a 10–15° tilt, this angle is about 44°.

The beam 16 striking the mirror $I_{23}$ is reflected up at an angle and reflected back by upper mirror $O_{32}$ along output axis $O_3$, which lies in the output plane $P_{out}$. In this preferred embodiment, the upper mirror $O_{32}$ is also offset by the same angle θ as the lower mirror, and the tilt angle α is also the same. In this preferred embodiments, the upper and lower substrates are identical. To form the upper substrate it is merely necessary to flip over the lower substrate and rotate it by 90°.

As a result the two arrays need to be displaced relative to each other in the direction of the input axis by an amount sufficient to ensure that the light reflected up from input $I_{23}$ mirror when tilted at an angle of strikes the output mirror $O_{32}$. Instead of arranging the mirrors in a square grid, they are arranged in a skewed arrangement such that the rows are not orthogonal to the columns. The input and output mirrors are rotationally offset by an angle θ slightly less than 45° with respect to the incoming and outgoing beam in order to keep the output beams in the plane of the upper chip 10. As a result, the output beam is no longer perpendicular to the input beam. Since it is desirable for the output fibers $15_{1...4}$ to extend at right angles to edge of the chip, contoured waveguides $21_{1...4}$ lead the light from the skewed columns $O_{1...4}$ to the output fibers $15_{1...4}$. The input waveguides $20_{1...4}$ are similarly contoured for the same reason.

Although not essential, the two arrays are preferably identical. To form the upper array, the lower array is flipped over about the horizontal axis and laterally offset in vertical direction (as shown on the page) so that the beams reflected from the input mirrors strike the corresponding output mirrors. While, for convenience, reference is made to input and output mirrors, it will be appreciated that the crosspoint switch is bi-directional, so that an input mirror can become an output mirror and vice versa. In order to ensure correct alignment of the arrays they can be micromachined with locating pins 35 and corresponding holes 36, or other complementary structures, such as ridges and grooves.

As noted above, the wave guides are axially aligned to the fibers which are located in V-groove structures for alignment purpose. The waveguides and V-grooves are micromachined structures etched in the $P_{IN}$ and $P_{OUT}$ planes. The incoming and outgoing beams must also lie in the $P_{IN}$ and $P_{OUT}$ planes respectively.

Microlenses can be placed at the ends of waveguides as collimators.

Figure 1:
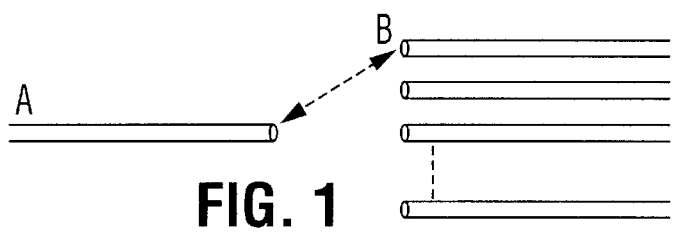
FIG. 1 illustrates diagrammatically a prior art electromechanical switch.
Figure 2:
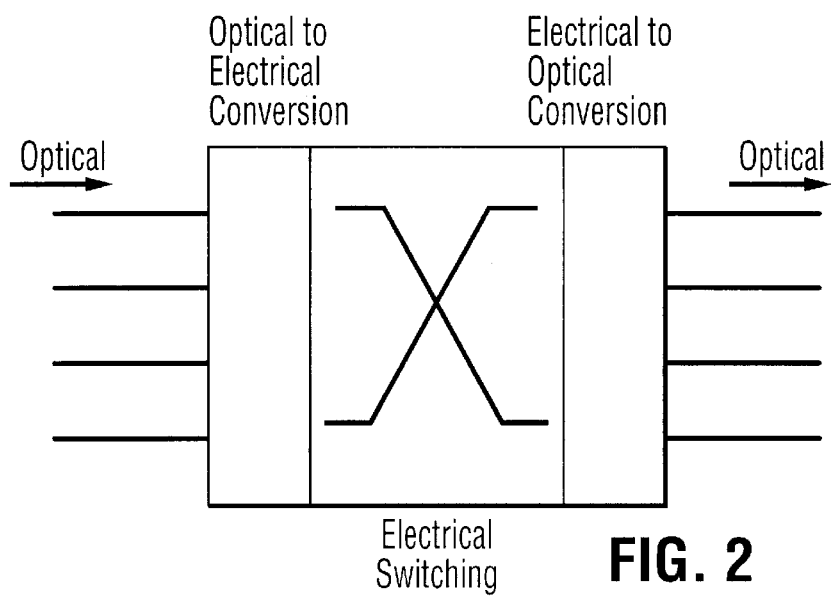
FIG. 2 shows a hybrid optical switch.
Figure 3:
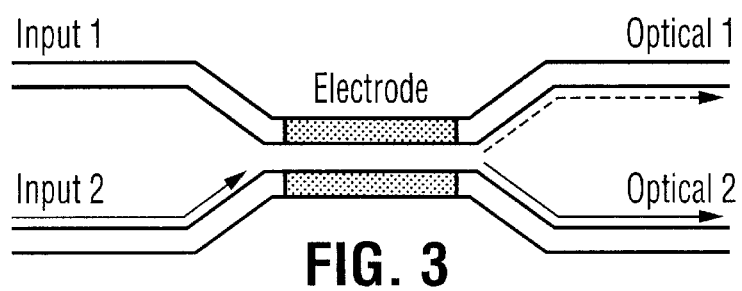
FIG. 3 shows a directional coupler.
Figure 4:
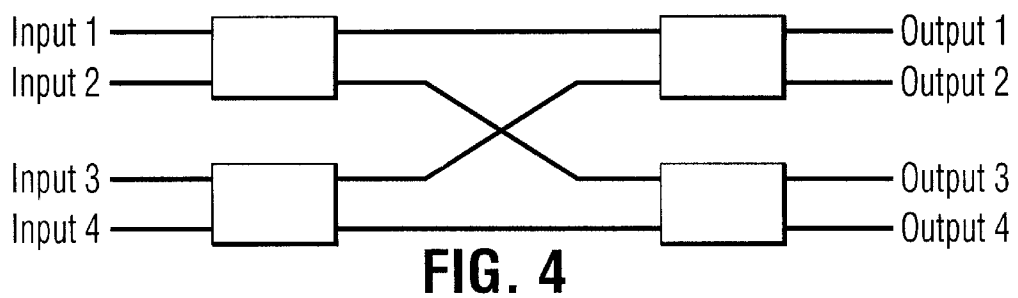
FIG. 4 shows N×N crosspoints using directional couplers.
Figure 5:
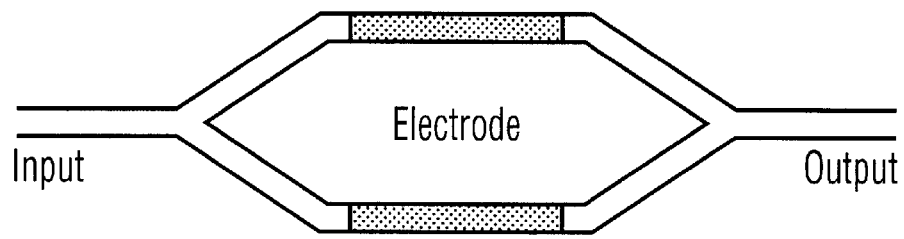
FIG. 5 show a Mach-Zender Interferometer.
Figure 6:
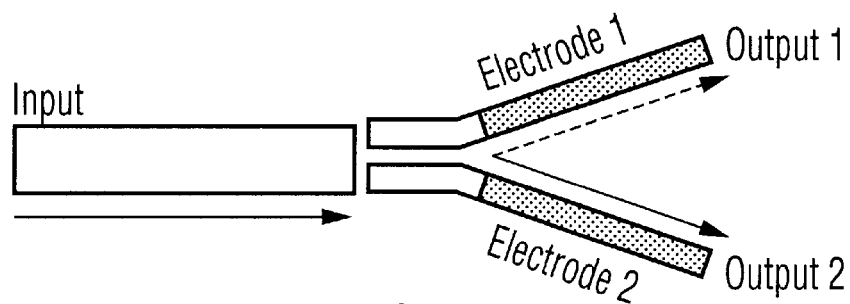
FIG. 6 shows a digital optical switch.
Figure 8:
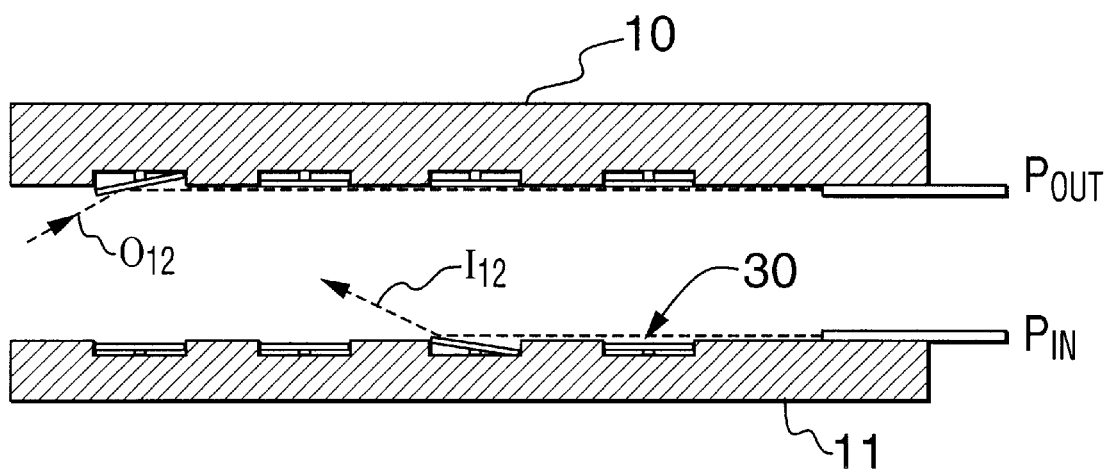
FIG. 8 is a sectional view of the two superimposed arrays.

As shown in FIG. 8, which in which the upper section is taken along line $O_3$ in FIG. 7, and in the lower section is taken along the line $I_2$ in FIG. 7, the non selected mirrors remain parallel to the $P_{IN}$ and $P_{OUT}$ planes, thus allowing the input and output beams to pass over them unhindered. When the input beam strikes the selected mirror $I_{23}$, it is reflected to the corresponding selected mirror $O_{32}$ in the $P_{OUT}$ plane.

In order to complete the optical path, the input mirror $I_{12}$ has to be tilted out of the $P_{IN}$ plane by an angle α to reflect the beam toward the output mirror $O_{12}$.

The output mirror $O_{32}$, which is rotationally offset by an angle θ in the $P_{OUT}$ plane must be tilted out of the $P_{OUT}$ plane by an angle α to reflect the beam in a plane parallel to the input plane.

In the selected state the tilt of mirrors $I_{23}$ and $O_{32}$ with respect to their X/Y planes is defined as α, where α is an angle such that 0°<α<45°. $θ_{IN}$ and $θ_{OUT}$ are the angles between the mirror's tilt axis and to the $X_{IN}/X_{OUT}$ axis, which for a 10° tilt angle is about 44°.

Assuming the $θ_{IN}$ angle to be between 0° and 90°, then for each angle α there is a $θ_{IN}$ and $θ_{OUT}$ that will result in a reflected beam C that lies in the $P_{OUT}$ plane.

The choice of and h that depends upon micromachining capabilities, required optical performances, and packaging considerations. h is typically lies in the range 50–100μ.α and θ are typically 10° and 44° respectively.

With increasing accuracy of micromirror technology, one of the grid arrays could be replaced with a line of micromirrors having a tilt angle determined by the control voltage. This would allow an input beam to be selectively reflected to an output mirror by setting an appropriate control voltage.

The mirror arrays can advantageously be of the type described in our copending Canadian patent application no. 2,246,559, the contents of which are herein incorporated by reference. With such a mirror, the deflection angle can be increased to 45°, which permits the mirror arrays to be placed directly one on top of the other without the need for the skewing that is necessary when the deflection angle is less than 45°. This patent application describes a mirror arrangement where either the mirror elements are mounted about an asymmetrically located pivot line so that the segments can tilt more in one direction than in the other, or they have on their surfaces a series of raised mirror facets extending transversely across the strip as shown in FIGS. 10 and 11.

Figure 10:
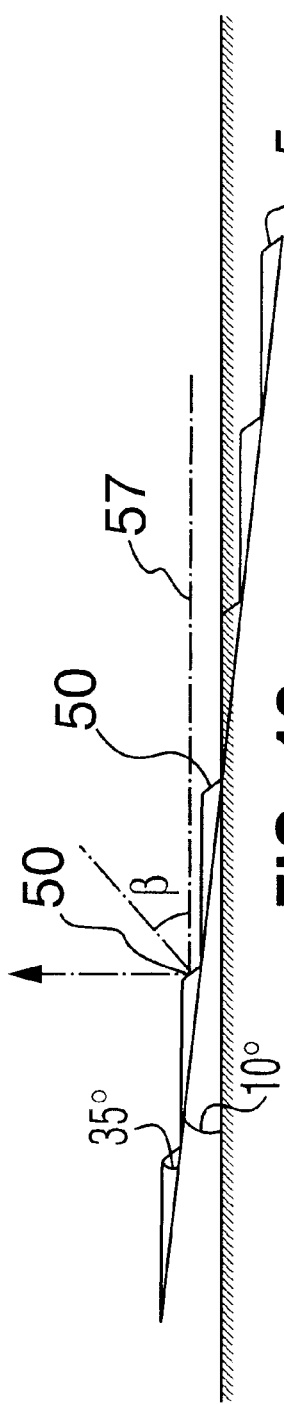
FIG. 10 is a side view of a mirror element suitable for use in the invention.
Figure 11:
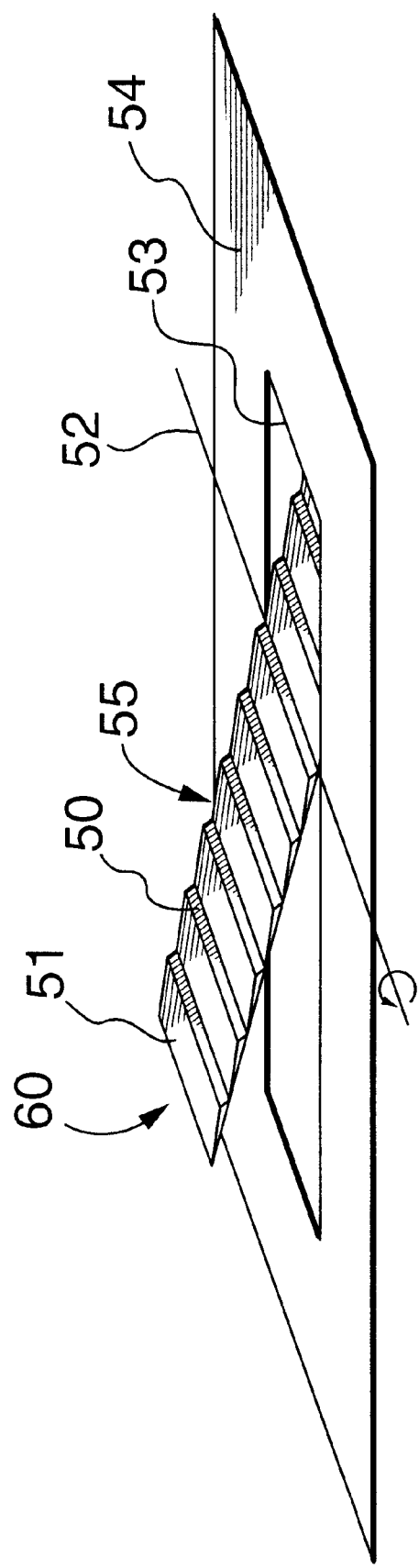
FIG. 11 is a perspective view of the mirror element shown in FIG. 10.

In FIGS. 10 and 11, mirror segment 60 is pivotally mounted about pivot axis 52 in well 53 of substrate 54. Facets 50 are provided on the leading edges of prisms 55 formed on the upper surface of the mirror segments 60 and make an angle, for example, 35° with the surface of the mirror segment. When the mirror segment is tilted 10°, incident light is by deflected 45° as shown in FIG. 10, where incident light ray 57 strikes facet 50 at an angle of 45°(10° due to tilt angle and 35° due to the angle of the facet).

The facet spacing should be large in comparison with the wavelength of the light. Typically, for 1.5 μ light, the facet spacing should be in the order of 15 μ. The mirror segment length is typically 100 μ.

In a further embodiment, small facets can be employed to take advantage of interference effects. By forming specific patterns on the mirror surface, the reflected beam can be formed directly and both its reflection angle and dispersion angle controlled.

The photonic switching device described has the advantage of being an optically passive device with theoretically zero attenuation.

We claim:

1. A photonic switching device comprising a first set of optical waveguides, a second set of optical waveguides, first and second opposed arrays of controllable deformable micromirrors associated respectively with said first and second sets of optical waveguides, at least one of said arrays being arranged in rows and columns, and said pairs of micromirrors being selectively tiltable, one from each array, to complete an optical path from any one of said first set of optical waveguides to any selected one of said second set of optical waveguides via a said pair of micromirrors.

2. A photonic switching device as claimed in claim 1, wherein said first and second arrays are arranged in rows and columns, the angle to which said mirrors can be tilted being preset to complete an optical path via predetermined pairs of said mirrors, and said first and second arrays thereby forming a non-blocking optical crosspoint switch.

3. A photonic switching device as claimed in claim 2, wherein said micromirrors in said arrays are arranged in a non-rectangular grid, the tilt axes of said micromirrors being set at an angle to the rows such that the beams reflected from the tilted micromirrors lie in a plane parallel to the plane of the array and extend along said rows of micromirrors.

4. A photonic switching device as claimed in claim 3, wherein said arrays form a rhombic grid, said arrays being laterally offset in the transverse and longitudinal directions.

5. A photonic switching device as claimed in claim 4, wherein said arrays are substantially identical.

6. A photonic switching device as claimed in claim 3, wherein said sets of optical waveguides are curved to lead light signals between said rows and input and output optic fibers.

7. A photonic switching device as claimed in claim 2, wherein the crosspoint switch formed by said opposing arrays is bi-directional.

8. A photonic switching device as claimed in claim 1, wherein said first and second waveguides are formed in respective substrates supporting said micromirror arrays.

9. A photonic switching device as claimed in claim 1, wherein said waveguides are coupled to incoming and outgoing optical fibers.

10. A photonic switching device as claimed in claim 1, wherein said micromirrors include raised reflective facets an their surface to increase the deflection angle of an incident ray.

11. A photonic switching device as claimed in claim 10, wherein said raised facets form deflect incident light through interference effects.

12. A method of switching optical signals between a first set of optical waveguides and a second set of optical waveguides, comprising deploying first and second opposed arrays of controllable deformable micromirrors between said first and second set of waveguides, at least one of the arrays being arranged in rows and columns, and controlling pairs of said micromirrors, one from each array, to selectively complete an optical path between any one of said first set of waveguides and any selected one of said second set of waveguides via a said pair of said micromirrors.

13. A method as claimed in claim 12, wherein the arrangement of deformable micromirrors comprises first and second opposed arrays of controllable deformable micromirrors arranged in rows and columns, said first set of optical waveguides associated with the rows of one of said arrays, and said second set of optical waveguides associated with the rows of the other of said arrays, and wherein selected micromirrors from each of said arrays can be tilted to complete an optical path from any one of said first set of optical waveguides to any selected one of said second set of optical waveguides, said first and second arrays thereby forming an optical crosspoint switch.

14. A method as claimed in claim 13, wherein the rows and columns of at least one of said arrays are arranged in a non-rectangular grid, with the hinge axis of the micromirrors being rotationally offset to the rows by an angle selected to ensure that the reflected beam lies in a plane parallel to the plane of the array.

15. A method as claimed in claim 14, wherein the arrays are rhombic.

16. A method as claimed in claim 15, wherein the arrays are substantially identical.

17. A method as claimed in claim 15, wherein the arrays are laterally offset in transverse and longitudinal directions, said arrays being formed on substrates having micromachined locating means formed thereon.

18. A method as claimed in claim 15, wherein said micromachined locating means comprise pins and holes.

19. A method as claimed in claim 15, wherein said micromachined locating means comprise grooves and ridges.

20. A photonic switching device as claimed in claim 1, wherein said micromirrors are tiltable through an angle of about 10° to 15°.

21. A photonic switching device as claimed in claim 20, wherein the axes of the mirrors are rotationally offset to the paths of the respective rows and columns by about 44°.

22. A method as claimed in claim 12, wherein said micromirrors are tiltable through an angle of about 10° to 15°.

23. A method as claimed in claim 22, wherein the axes of the mirrors are rotationally offset to the paths of the respective rows and columns by about 44°.

* * * * *